(12) United States Patent  (10) Patent No.: US 6,692,637 B2
Fox et al.  (45) Date of Patent: Feb. 17, 2004

(54) DUAL DENSITY FILTER CARTRIDGE

(75) Inventors: John Edward Fox, Blacksburg, VA (US); Rodney Allen Parker, Blacksburg, VA (US)

(73) Assignee: Tetra Holding (US), Inc., Blacksburg, VA (US)

( * ) Notice: Subject to any disclaimer, the term of this patent is extended or adjusted under 35 U.S.C. 154(b) by 88 days.

(21) Appl. No.: 10/037,260

(22) Filed: Nov. 7, 2001

(65) Prior Publication Data

US 2003/0085167 A1 May 8, 2003

(51) Int. Cl.$^7$ .......................... A01K 63/04; B01D 24/04
(52) U.S. Cl. ............... 210/169; 210/232; 210/282; 210/283; 210/416.2; 210/486; 210/489
(58) Field of Search .................. 210/169, 282, 210/283, 416.2, 484, 486, 489, 492, 232, 416.1

(56) References Cited

U.S. PATENT DOCUMENTS

| | | | | |
|---|---|---|---|---|
| 2,788,901 A | * | 4/1957 | Boeddinghaus et al. .... | 210/486 |
| 3,276,597 A | * | 10/1966 | Mesek et al. ............. | 210/489 |
| 3,513,978 A | | 5/1970 | Newsteder | |
| 3,523,435 A | | 8/1970 | Williams et al. | |
| 3,593,854 A | * | 7/1971 | Swank ................... | 210/326 |
| 3,680,707 A | * | 8/1972 | Seek .................... | 210/266 |
| 4,073,732 A | * | 2/1978 | Lauer et al. ............ | 210/491 |
| 4,497,707 A | * | 2/1985 | Anderson ............... | 210/136 |
| 4,512,885 A | * | 4/1985 | Willinger .............. | 210/136 |
| 4,728,422 A | * | 3/1988 | Bailey .................. | 210/314 |
| 4,732,675 A | * | 3/1988 | Badolato et al. ........ | 210/314 |
| 4,783,258 A | * | 11/1988 | Willinger et al. ....... | 210/169 |
| 4,880,549 A | * | 11/1989 | Willinger et al. ....... | 210/805 |
| 4,891,227 A | | 1/1990 | Thaman et al. | |
| 4,891,228 A | | 1/1990 | Thaman et al. | |
| 5,053,125 A | * | 10/1991 | Willinger et al. ....... | 210/169 |
| 5,397,463 A | | 3/1995 | Woltmann | |
| 5,399,265 A | * | 3/1995 | Nehls .................... | 210/490 |
| 5,674,591 A | | 10/1997 | James et al. | |
| 5,686,088 A | | 11/1997 | Mitra et al. | |
| 5,785,725 A | * | 7/1998 | Cusick et al. ........... | 55/382 |
| 5,954,451 A | * | 9/1999 | Presby ................... | 405/49 |

* cited by examiner

*Primary Examiner*—Fred G. Prince
(74) *Attorney, Agent, or Firm*—Merchant & Gould P.C

(57) ABSTRACT

The invention relates to aquarium filters providing improved water filtration without accelerated clogging. The present invention also relates to methods of using such filters.

21 Claims, 9 Drawing Sheets

DUAL DENSITY FILTER CARTRIDGE

FIELD OF THE INVENTION

The invention relates to aquarium filters providing improved mechanical water filtration without accelerating the rate of clogging. The present invention also relates to methods of using such filters.

BACKGROUND OF THE INVENTION

Aquarium filter systems which continuously circulate water from an aquarium, through a filter medium and, then, back to the aquarium are well known in the art. One such type of aquarium filter system is represented by the external-type system which employs a small container comprising a filter mounted on the side of the aquarium. The water from the aquarium is drawn by means of a water pump, it flows through filter medium in the container and is then returned to the aquarium. The filter medium is usually in the form of elements of activated carbon or charcoal and fluffy masses of synthetic resin fibers.

Examples of external-type filter systems can be found in U.S. Pat. No. 3,513,978 to Newsteder and U.S. Pat. No. 3,525,435 to Conner, both of which are herein incorporated by reference in their entirety.

The Newsteder system uses two separate compartments, each filled with a different filtering substance (i.e., fibrous filtering material and charcoal respectively). The water flows through the fibrous material and then through the charcoal before going back to the aquarium. In this type of filter, however, the compartment holding the charcoal must have very restricted openings to prevent any charcoal from passing through openings into the aquarium.

The Conner filter uses a perforated top with a dependent filter bag that is filled with charcoal. The flow of the water is down through the top, out through the bag walls and then back into the tank. The Conner filter is wholly disposable. The filter, however, lacks a mechanism for mechanically or physically filtering water prior to passing through the charcoal. Consequently, the filter allows waste particles to enter the interior space of the filter and, thereby, reduce the effectiveness of the charcoal. Specifically, particulate matter can block (or occlude) the surface of adsorbents like charcoal and activated carbon and, thus, reduce their capacity to surface adsorb dissolved gases and toxins.

Another type of aquarium filter is the internal or underwater filter. A container is provided which includes a filter medium such as activated carbon or charcoal and a fluffy mass of synthetic resin fibers. An air lift is provided, extending vertically up from the container, and air is pumped down into the base of the air lift from an external air pump. The air rises which, in turn, induces water flow into the container, such that the water passes through the filter medium and, then returns back to the aquarium.

In aquarium filtration, the filter medium provides various types of filtration activity. As the water flows through a porous wall, mechanical filtration of the water occurs with the walls acting as a sieve, retaining the solid contaminants. The mechanical filtering capability of this "sieve-type" mechanism increases for finer contaminants as the surface area of the porous wall increases and the pore size of the openings or interstices decrease. Increasing the density of the porous wall results in improved trapping of smaller particles. Such increases in the surface area of the porous wall, however, also results in accelerated clogging rates of the porous wall. Therefore, a need exists for filter cartridges providing mechanical filtration using high density (or, high surface area) porous walls to improve the filtration of finer contaminants without a corresponding acceleration in the clogging rate of the filter cartridge as a whole.

The present inventors have discovered that filter cartridges incorporating dual density filters, comprising a low-density (surface area) in-flow porous wall and a high-density (surface area) out-flow porous wall, provide improved mechanical filtration without accelerating clogging.

Accordingly one aspect of the present invention is to provide improved filter cartridges.

A further aspect of the present invention is to provide filter cartridges which improve mechanical filtration without accelerating the clogging of the filter cartridge.

A still further aspect of the present invention is to provide filter cartridges comprising a plurality of filter walls produced from porous materials, with each wall varying in density or surface area such that the density or surface area of the filter walls increases in the direction of water flow.

These and other advantages are accomplished by the present invention as will be further detailed in the following description.

SUMMARY OF THE INVENTION

The present invention relates to water filter articles, comprising:
a.) a first porous filter wall for filtering liquid flowing into the filter article; and
b.) a second porous filter wall for filtering liquid flowing out of the filter article
wherein the density or surface area of the first porous filter wall is less than the density or surface area of the second porous filter wall. Methods of using the disclosed filter are also described.

Frame

The frame is constructed with laterally projecting separators. The separators extend across the filter cartridge and have a narrow dimension transverse to the flow of the aquarium water there across so as to cause only minor restriction to the flow. The separators have a broad dimension parallel to the direction of flow, and can serve to space apart the filter walls. The surface of the frame is also textured to provide increased available surface area. This increased surface area additionally provides a support media for growing organisms active in biological filtration.

The frame also provides an internal structure for the plurality of filter walls described herein. Accordingly, water can be, first, circulated through an in-flow filter wall on one side of the filter cartridge, next, through the interior space of the filter cartridge and, finally, exit through the out-flow filter wall on the opposite side of the filter cartridge. The in-flow filter wall of the filter cartridge captures and retains large contaminants from the water before it reaches any optional chemical filtration material, such as activated carbon, typically disposed within the filter cartridge while the out-flow filter wall filters out smaller contaminants.

Frames suitable for use herein are described in detail in U.S. Pat. No. 5,053,125 to Willinger et al., herein incorporated by reference in its entirety.

Filter Walls

The filter cartridges of the present invention comprise at least two filter walls. The filter walls of the present invention are, preferably, comprised of a water permeable porous, filter membrane material. The density or surface area of the filter membrane material differs from one filter wall to the next, with the first filter wall (or the filter wall receiving incoming water) having a lower density or surface area than the second filter wall. Water exiting the lower density or first filter wall will contain fewer particulates, thus, reducing the surface loading on the carbon and enhancing its effective life. The higher density out-flow or second filter wall, in turn, filters the finer waste particulates as well as prevent carbon from being carried out of the filter by the water flow into the aquarium.

The membrane can be formed of an open web of closely spaced and randomly disposed fibrous or filamentary substances and/or polymeric materials which form a 3-dimensional matrix and provides for numerous interstices or pores defining water passages. Any filter material or substance suitable for forming such matrices, interstices or pores can be used to form the filter walls of the present invention. Passage of the water through the interstices in the membrane material causes mechanical filtration of the water by the filter walls retaining solid waste and other contaminants. Increasing the density or surface area of the porous material increases the mechanical filtration capability of the filter wall for finer particulate contaminants.

Suitable porous membrane materials include a variety of water insoluble substrate materials. Particularly useful as the porous materials in the present invention are reticulated foams, synthetic resin fibers, nonwoven fibrous materials and mixtures thereof.

Nonwoven Fibrous Material:

A detailed discussion of nonwoven fibrous materials can be found in Riedel, "Nonwoven Bonding Methods and Materials," *Nonwoven World* (1987); *The Encyclopedia Americana*, vol. 11, pp. 147–153, vol. 21, pp. 376–383, and vol. 26, pp. 566–581 (1984); U.S. Pat. No. 4,891,227, to Thaman et al., issued Jan. 2, 1990; and U.S. Pat. No. 4,891,228 and U.S. Pat. No. 5,686,088 to Mitra et al., issued Nov. 11, 1997; U.S. Pat. No. 5,674,591; James et al; issued Oct. 7, 1997; all of which are herein incorporated by reference in their entirety. The term "density", as used herein in connection with nonwoven fibrous materials, means the number of pores or interstices per unit measure (i.e., volume or length) of a porous wall such that higher density porous walls have more pores of various sizes, and preferably smaller pores, per unit volume than lower density porous walls.

Preferably, the nonwoven fabric material of the filter walls has a weight per unit length ranging from 2 (or about 2) oz per linear yard to 15 (or about 15) oz per linear yard, more preferably from 2 (or about 2) oz to 5 (or about 5) oz per linear yard and most preferably 2.5 (or about 2.5) oz to 3.75 (or about 3.75) oz.

The nonwoven fibrous material making up the in-flow (first) and out-flow (or, second) filter walls are distinguished by the fiber deniers used to form them. Preferably, the nonwoven fibrous materials making up the first (or in-flow) filter wall comprises a blend of fiber deniers ranging from 4 (or about 4) to 20 (or about 20) denier, and between 1 (or about 1) and 4 (or about 4) inches long, and more preferably from 6 (or about 6) to 15 (or about 15) denier with lengths between 2 (or about 2) and 3 (or about 3) inches, resulting in a "low" or "lower" pore density filter walls.

In contrast, the nonwoven fibrous materials making up the second (or outflow) filter wall comprises a blend of fiber deniers ranging from 1 (or about 1) to 8 (or about 8) denier, and between 1 (or about 1) and 4 (or about 4) inches long, and more preferably from 2 (or about 2) to 6 (or about 6) denier with lengths between 1 (or about 1) and 2 (or about 2) inches, resulting in pore densities "higher" than those of the first or in-flow filter walls, provided that the blend of fiber deniers for the first filter wall is less than the blend of fiber deniers.

The blend of fibers in the first wall will have a significant portion of longer and larger denier fibers than the second wall.

Polymeric Foam Materials

Also useful herein are polymeric foam materials. Useful polymeric foams materials include those polymeric substances conventionally used in preparing polymer foams such as polyurethanes, including a polyether-polyurethane foam or a polyester polyurethane foam;

polyesters; olefin polymers, such as a polypropylene or polyethylene; vinyl and styrene polymers such as polyvinylchloride, and polyamides. Examples of commercially available preferred organic polymer substrates include polyurethane foams marketed by Foamex International, Inc., including polyether-polyurethane foams, and polyester polyurethane foams as well as foams marketed by Recticel S.A. Preferably, the polymer foams are reticulated foams.

In the case of polymer foams (e.g., reticulated foams), density, as used herein in connection with polymer foams, means to pores per inch (ppi) associated with a particular foam. Higher or high density polymer foam filter walls preferably have densities of from 20 (or about 20) to 45 (or about) 45 ppi, more preferably from 25 (or about 25) to 30 (or about 30) ppi while low or lower density polymer foam filter walls preferably have densities of from 10 (or about 10) to 30 (or about 25) ppi, more preferably from 15 (or about 15) to 20 (or about 20) ppi.

The filter cartridge can be inserted in an external or an internal filter apparatus such as a corner or bottom filter device. The filter walls can be in the form of an envelope, covering the rigid or semi-rigid frame and facilitating the sealing of the filter cartridge to the filtering apparatus along the interface between the two elements. This eliminates the need for a tight tolerance matching between the filter cartridge and the filter device and also prevents breaking or scratching the wall of the filter device.

Optionally, the filter cartridge of the present invention can be designed to hold particulate filter materials such as charcoal, activated carbon or mixtures thereof.

The filter cartridge can be used as a filtering device by itself by causing a flow of the water through the filter cartridge.

DESCRIPTION OF ONE PARTICULAR EMBODIMENT

Figure 1:
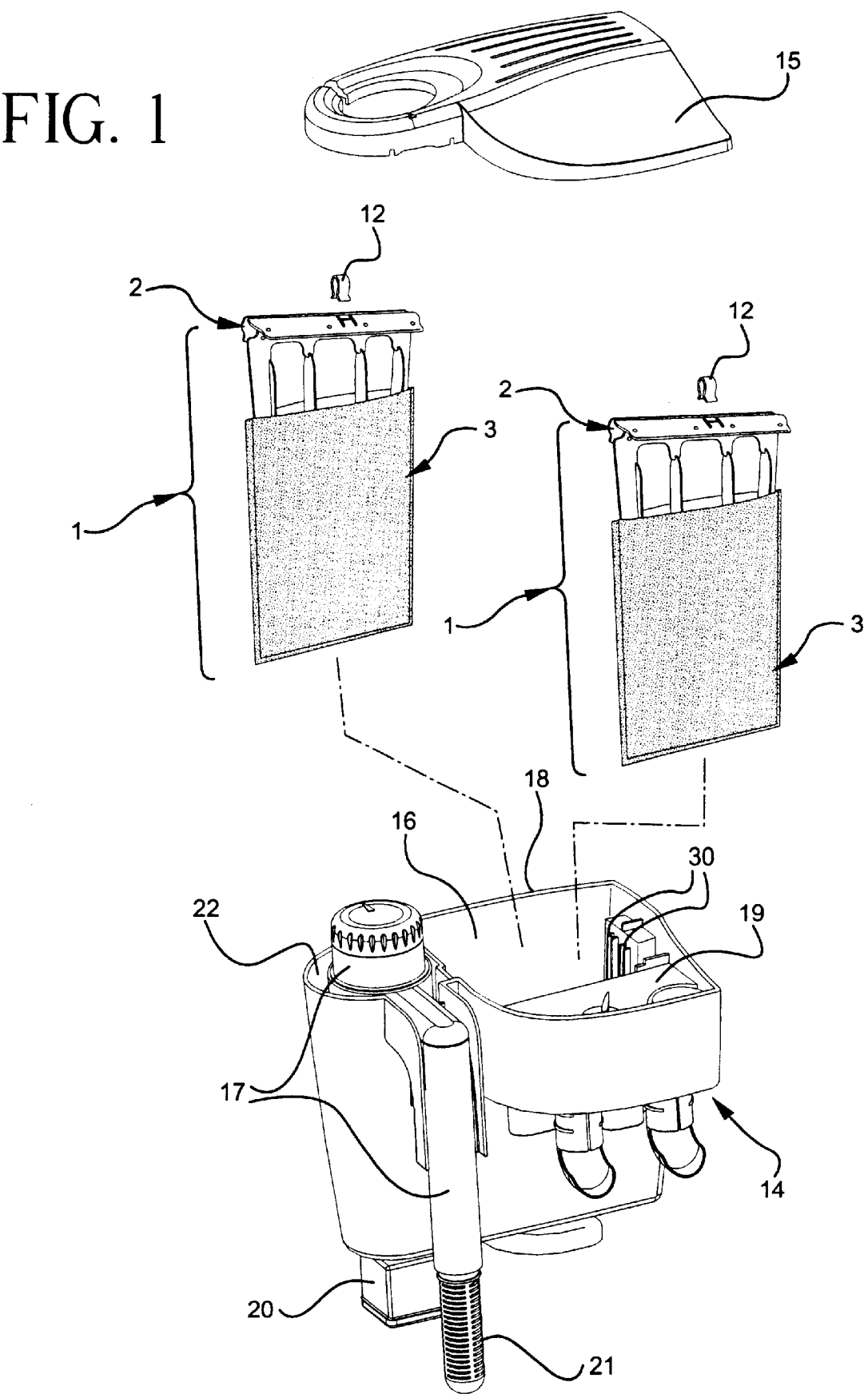
FIG. 1 is an exploded perspective view of an aquarium filter adapted to receive the filter cartridges of the present invention.

Referring to FIGS. 1–9, there is shown the filter cartridge 1 of the invention. The cartridge includes the frame 2 and a filter envelope 3. Charcoal or other filtration material 13 can be placed into the envelope.

Filter envelope 3 comprises a first or front filter wall 3a for filtering water flowing into filter cartridge 1 and second or back filter wall 3b for filtering water flowing out from filter cartridge 1. The density and/or surface area difference between the first and second filter walls represents a key feature of the present invention. The first filter wall comprises a porous filter material having a density and/or surface area similar to the filter materials used in the Bio-Bag® (Tetra-Blacksburg, Va.) or the filter materials described in U.S. Pat. No. 5,053,125, previously incorporated by reference. The second filter wall, however, comprises either the same or different type porous filter as the first filter wall provided the density and/or surface area of the second filter wall 3b is greater than that of the first filter wall 3a. Without being limited by theory, it is believed that increasing the density or surface area of the filter wall increases the capability of retaining finer waste/particulates trapped by the filter wall. Increasing filter wall density in this manner, however, also accelerates the clogging. The present inventors have found that by combining a first filter wall or panel of traditional density (e.g., that of the Bio-Bag®) for filtering incoming aquarium water with a second filter wall of higher density (or surface area) for the outlet flow filtration effectiveness is increased, without accelerating the clogging rate of the filter cartridge.

In one embodiment, the first and second filter walls are joined together using conventional binding technologies (e.g., heat sealing, mechanical binders etc.) at/on three of the four perimeter edges of each filter wall to form the envelope structure 3. It will be readily apparent that the first and second filter walls 3a and 3b of the present invention may be joined along the periphery by any number of various means provided an opening large enough to permit insertion of frame 2 is present. Additionally, should optional filter material 13 be present, the peripheral edges of the filter walls 3a and 3b should be so sealed as to prevent loss or leakage of the filter material.

The frame 2 can be molded plastic. It includes a perimeter defining a frame formed by top portion 4, bottom portion 5 and side portions 6. In one embodiment, two flaps 7 are hingeably attached to the top edge of top portion 4. Alternatively, the flaps 7 can be integrally molded with the frame and provided with plastic living hinges, that is, portions of plastic which are flexible and resist fatigue failure. In any event, the flaps may be attached in any known manner.

Figure 2:
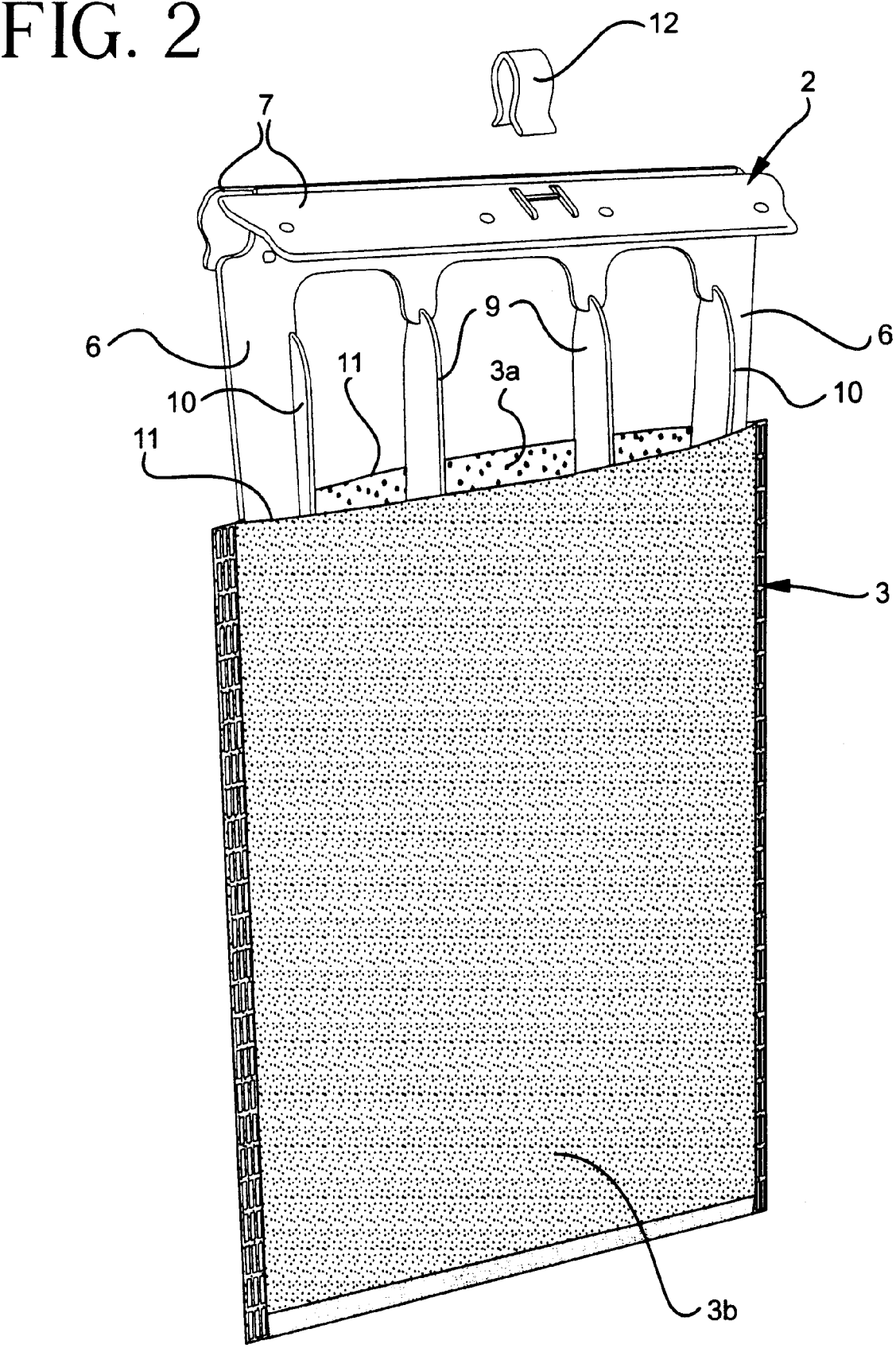
FIG. 2 is a partially exploded perspective view of the filter cartridge of the invention with the frame partially removed.
Figure 3:
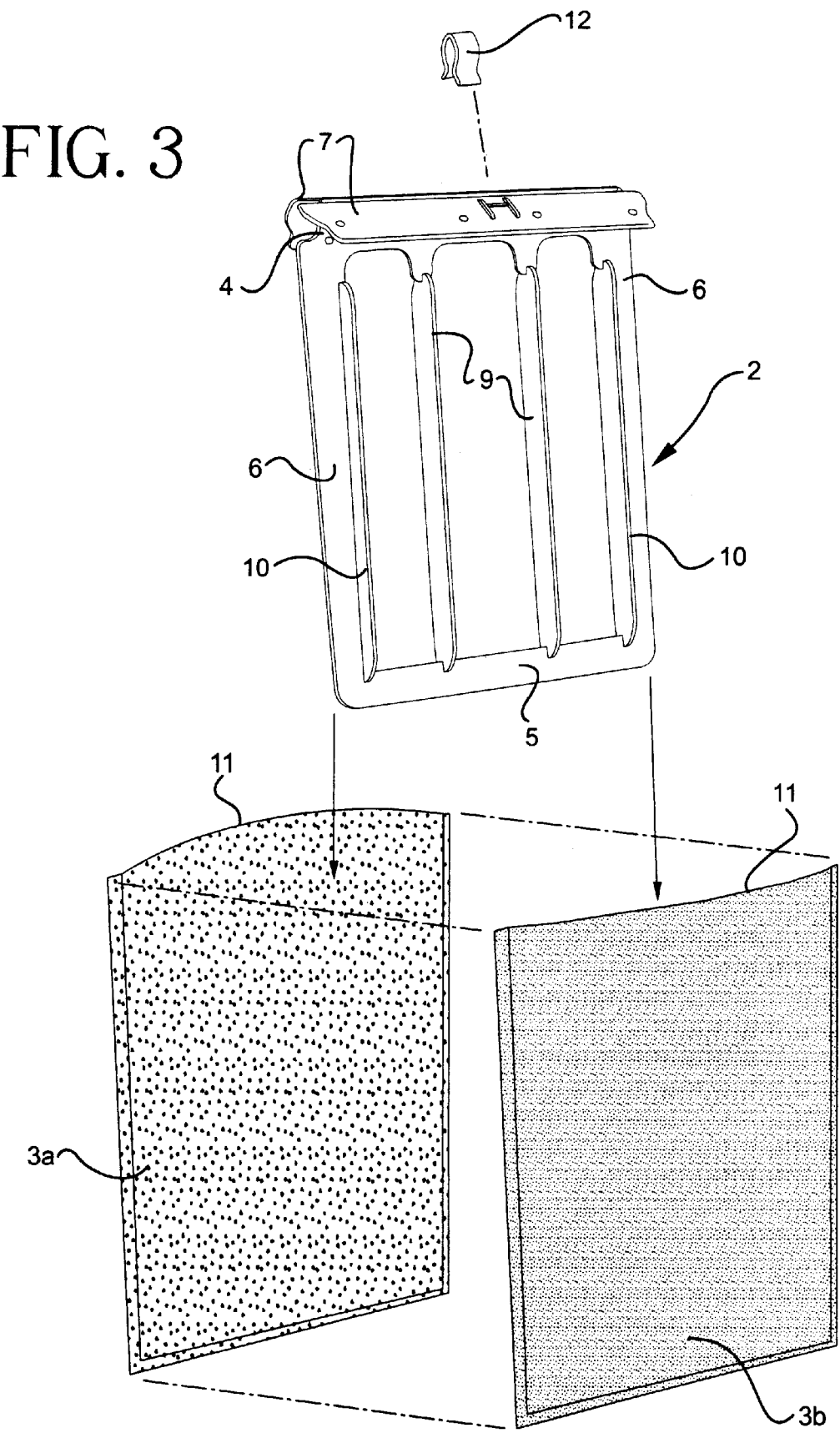
FIG. 3 is an exploded perspective view of the filter cartridge.
Figure 4:
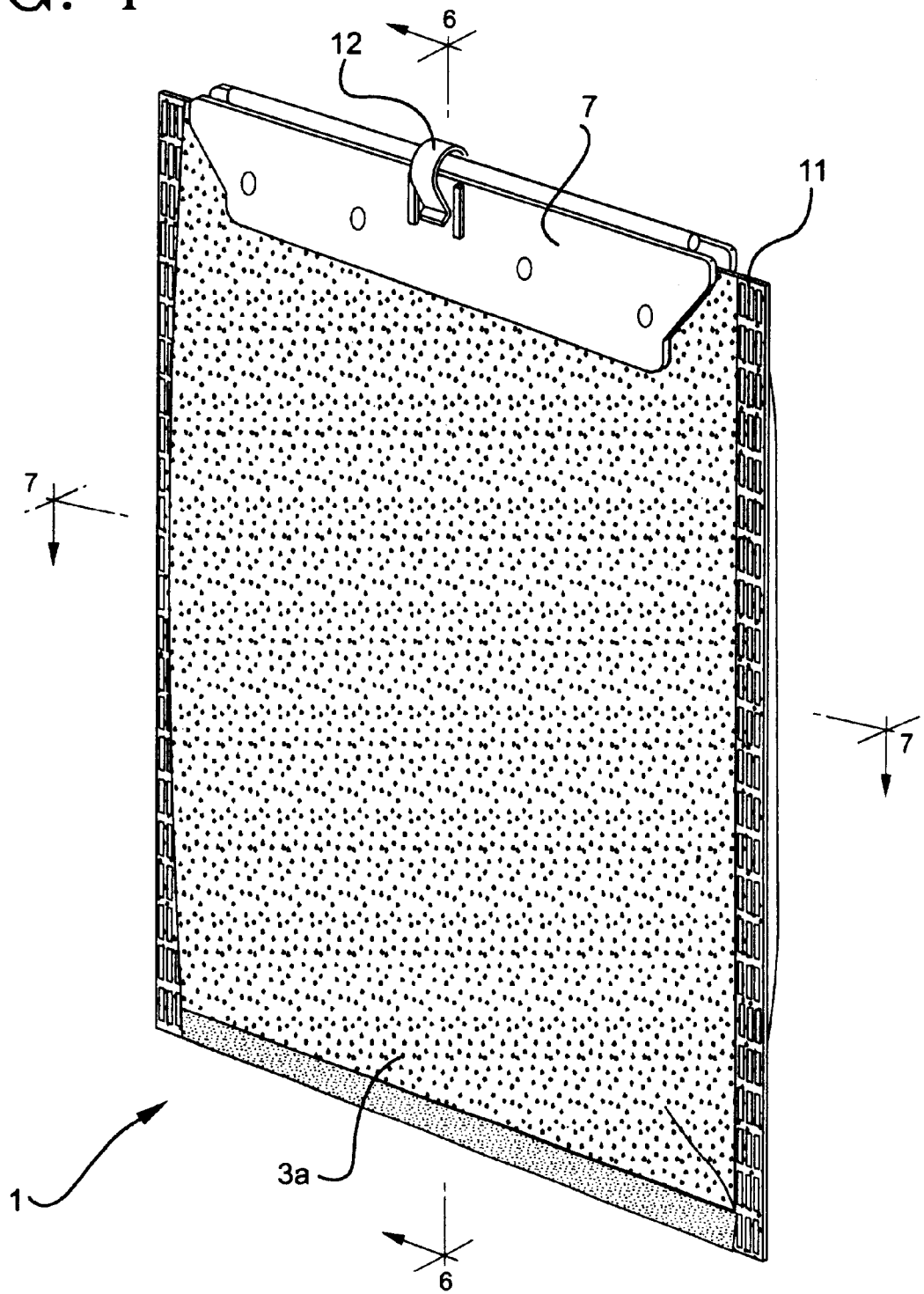
FIG. 4 is a outflow perspective view of the filter cartridges.
Figure 5:
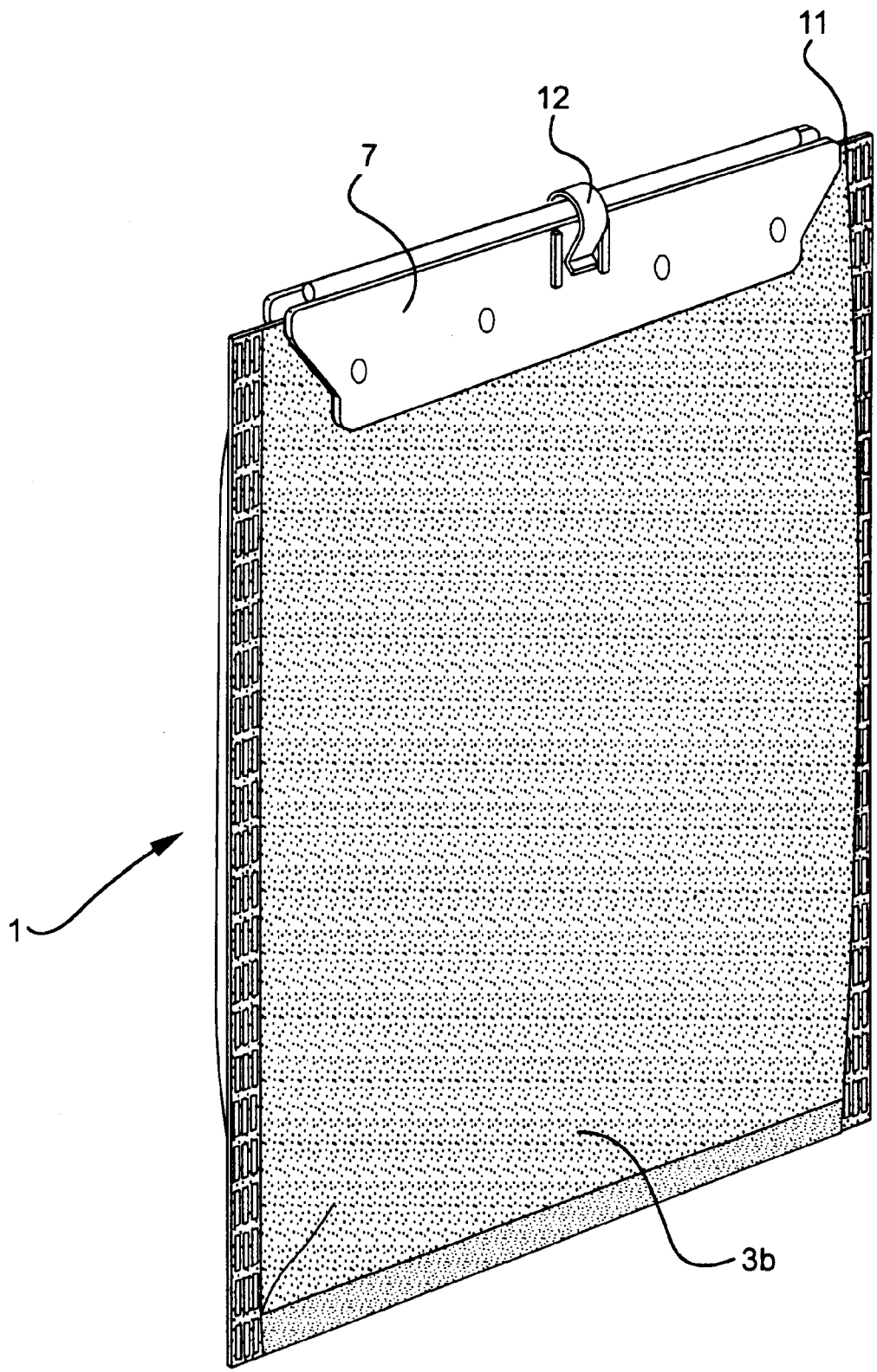
FIG. 5 is a inflow perspective view of the filter cartridges.
Figure 6:
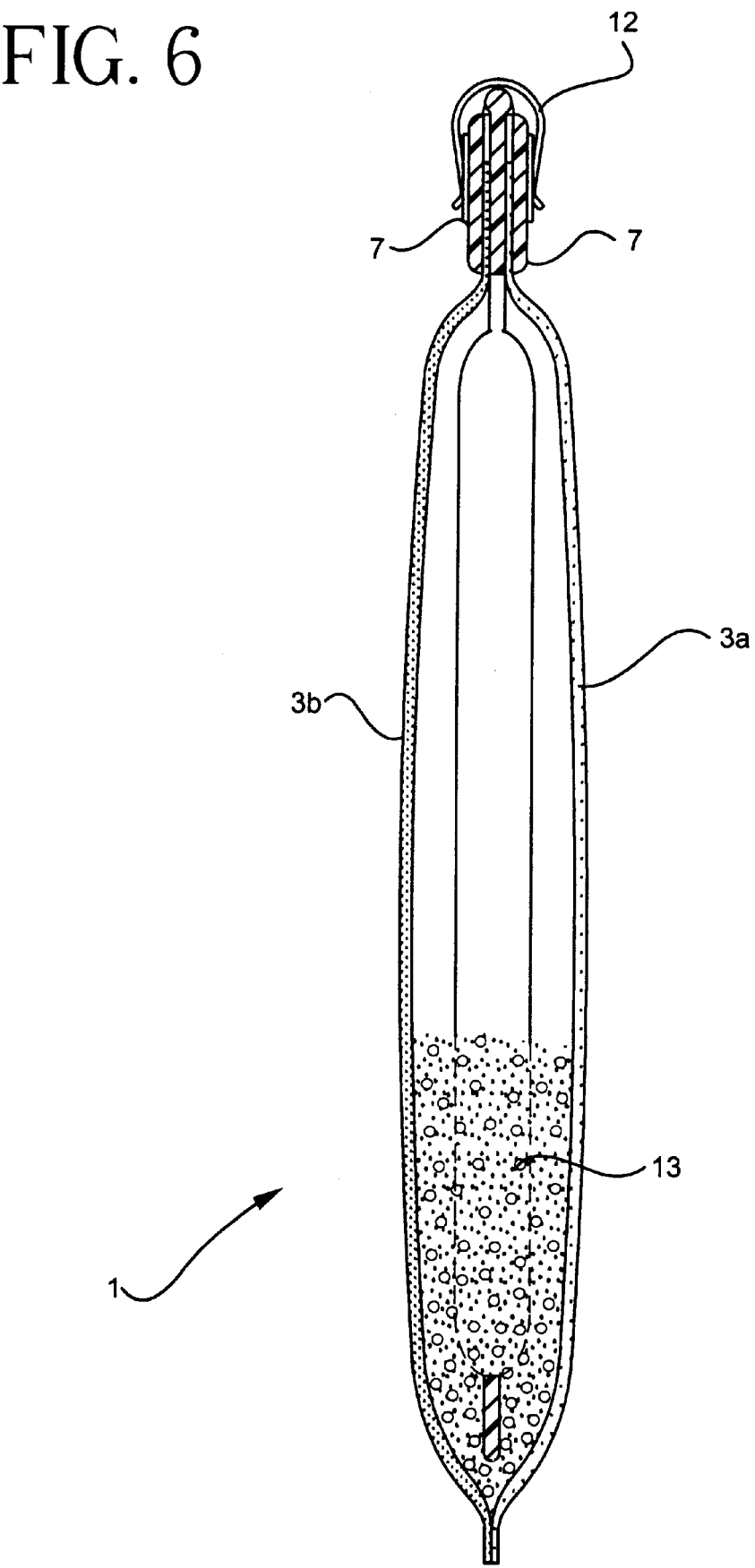
FIG. 6 is a vertical, cross-sectional view along lines 6—6 of FIG. 4 of the filter cartridge.
Figure 7:
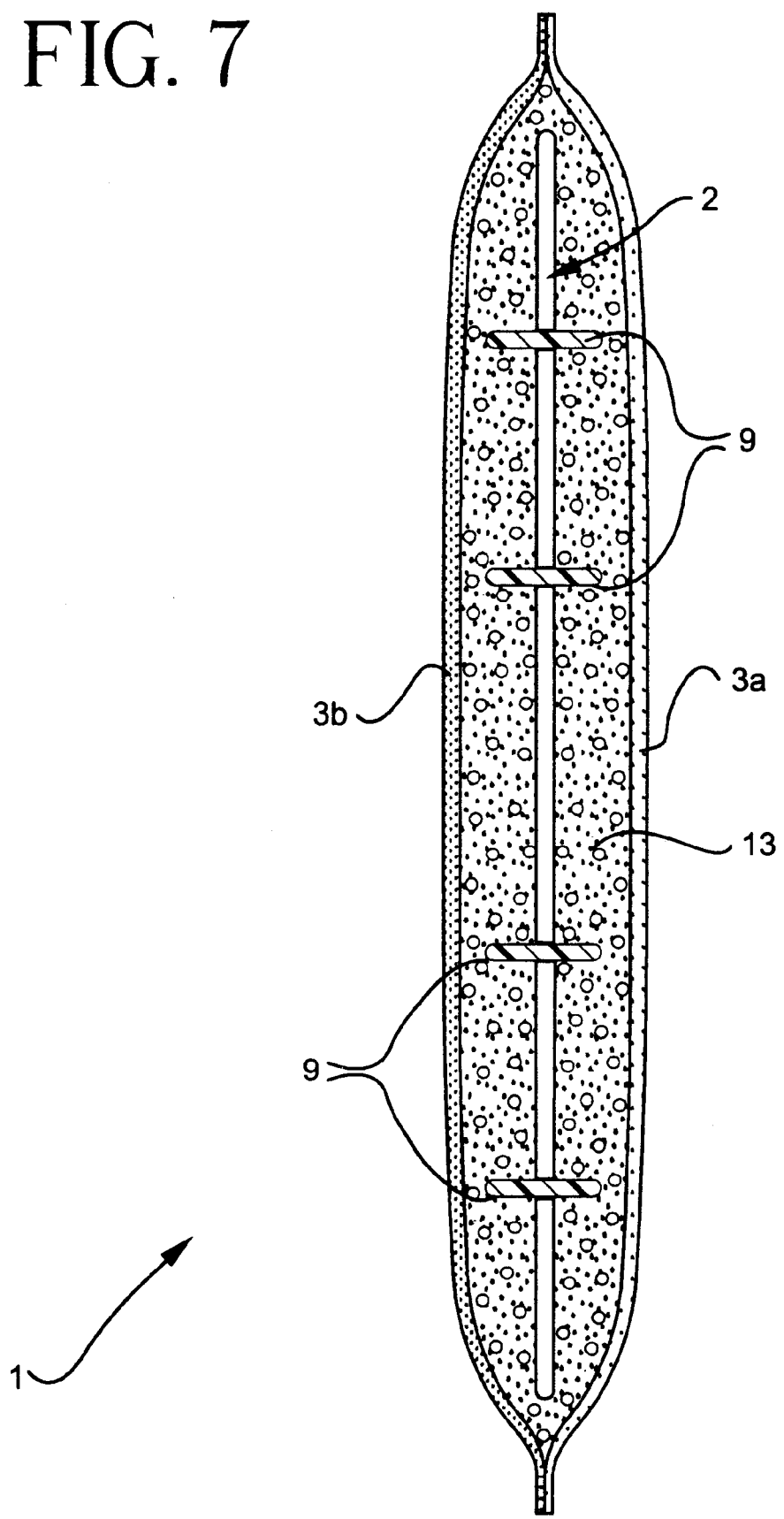
FIG. 7 is a horizontal, cross-sectional view along lines 7—7 of FIG. 4 of the filter cartridge.
Figure 8:
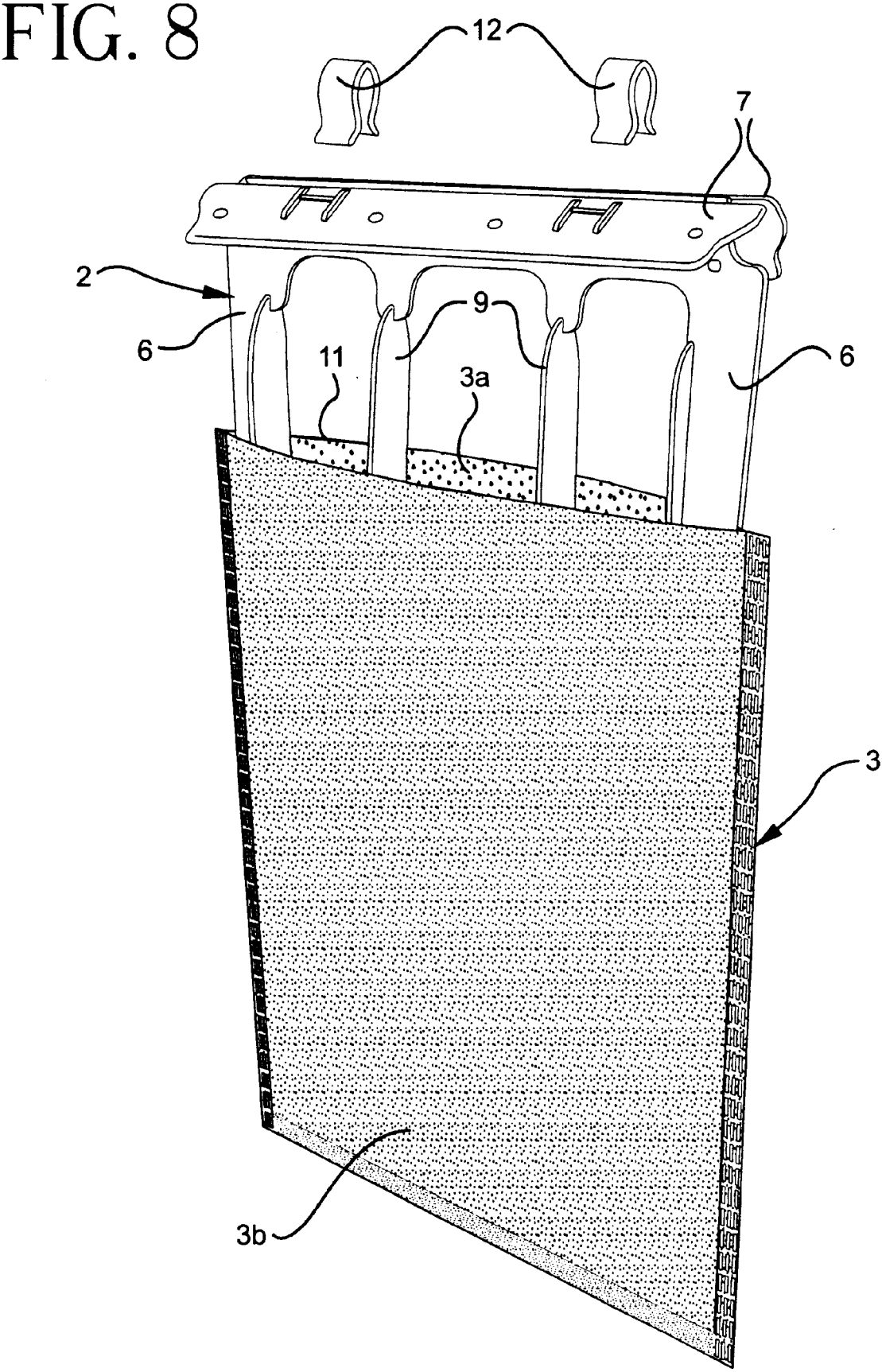
FIG. 8 is a partially exploded perspective view of an alternative embodiment of the filter cartridge of the invention with the frame partially removed using two clips to bind flaps.
Figure 9:
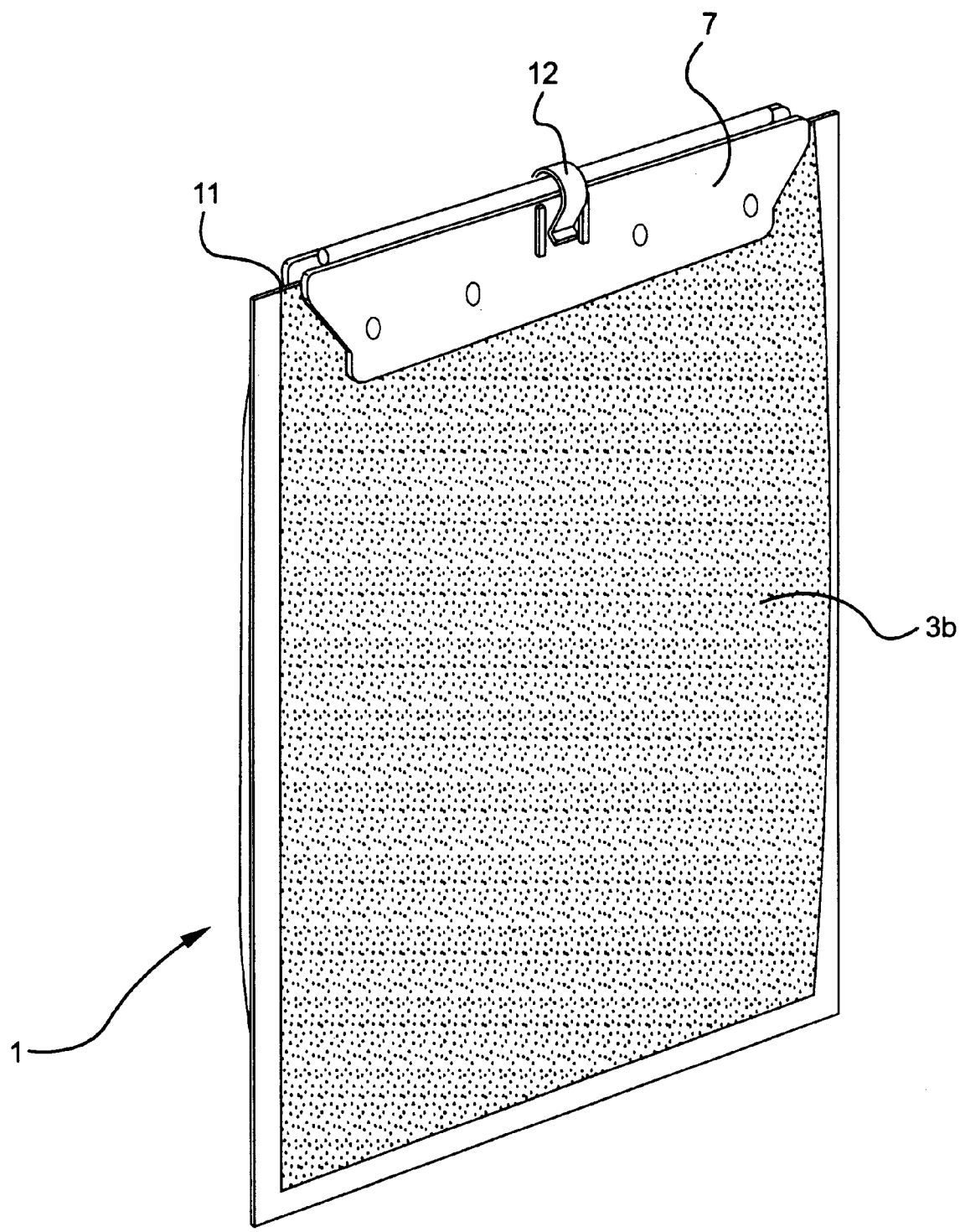
FIG. 9 is a outflow perspective view of an alternative embodiment of the filter cartridges using mechanical bindings to bind the bottom and side perimeters of the filter walls.

Traversing the interior of the peripheral frame are a plurality of separators 9. The separators 9 extend laterally beyond the front and back of the frame surface in the direction of flow of the water being filtered when the cartridge 1 is in use. In FIGS. 1–3, the separators are shown as vertical flanges which have a narrow thickness in the direction perpendicular to the plane formed by the perimeter of the filter frame. This minimizes the surface area which is transverse to the flow of the water being filtered when the cartridge 1 is in use. The separators 9 have a width which is one-half to three-quarters of an inch for a filter envelope 3 which is about four inches by six inches. The width of a separator 3 is measured in a direction perpendicular to the plane of the perimeter defining frame; that is, parallel to the direction of flow when the cartridge 1 is in use. There are similar flanges or separators 10 extending from side portions 6 of the frame.

In use, the frame is positioned within the filter envelope 3. A second treatment material such as activated carbon or charcoal 13 may be added to the envelope and the flaps 7 are folded down, sandwiching the upper edges 11 of the filter envelope 3 between the flap 7 and top portion 4. When the assembled cartridge 1 is inserted into a filter cartridge receiving slot 30, the flaps 7 will normally be held down. However, optionally, in order to assure that the flaps 7 hold the envelope 3 tightly, a clip 12 can be used. The clip 12 is also useful in preventing the escape of filtering material held in the filter envelope when shipping the cartridge pre-assembled. The clip 12 is U-shaped and is snapped over the flaps 7 once they have been folded down. The clip 12 biases the flaps toward one another thus holding the envelope 3 closed and sealed. It should be understood that other suitable biasing means may also be used, such as integrating the molding of the flaps 7 and the frame 2 so the flaps 7 are resiliently biased in the sandwiching position.

The separators 9 hold the opposing front and back walls of the envelope 3 in spaced relation. As the water is forced through the filter cartridge 1, it passes first through the first filter wall or panel, which initially filters the water. It then passes through and is, optionally, treated by the carbon or charcoal 13 or other filtration material placed in the envelope. Finally, the water flows through the second filter wall or panel of higher density or surface area than the first filter wall. This allows for additional filtering of particulate wastes and, additionally, restricts the passage of charcoal particles to the aquarium. The dual density filtering allows for improved filtration of finer particulate wastes without accelerating clogging.

The filter cartridge can be used in connection with an external filter device such as that described in FIG. 1. The illustration describes an external filter assembly comprising a tank 14 and optional cover 15 adapted to receive the filter cartridge 1. The filter cartridge 1 is slideably received in two opposing grooves forming the filter cartridge receiving slot 30 in the side walls partially defining a mechanical filtering chamber 16. Water from the aquarium is pulled into the filter tank through pump assembly 17 and drive motor 20 which are magnetically coupled as described in U.S. Pat. No. 5,397,463 to Woltmann et al., herein incorporated by reference in its entirety. Pump assembly 17 can be, optionally, equipped with a strainer 21 at the intake end so as to prevent pulling in fish or other objects which may jam or damage the impeller in the pump. The aquarium water is pumped into intake chamber 22. From the intake chamber 22, the water flows into the mechanical filtering chamber 16. The rising water level in the mechanical filtering chamber 16 between the (inserted) filter cartridge 1 and the back wall 18 and the force of gravity causes the water to flow through the first porous wall 3a. The water passing through the first filter wall or panel 3a is mechanically cleaned of relatively large contaminants/particulates in a sieve-like manner. Once within the filter envelope 3, the water is further cleansed by the, optional, filter material 13 (e.g., carbon) within the envelope 3. The water then passes through the second filter wall or panel 3b and is subject to a second and finer filtration stage. The water passes through the filter cartridge to the biological filter chamber 19 and, in one embodiment, is returned back into the aquarium by means of a siphon.

When the filter cartridge 1 becomes clogged with contaminants, it is removed, the envelope 3, the optional carbon and other filtration material are discarded and a new envelope 3 positioned on the frame. New carbon and other filtration material can be, optionally, placed within the envelope 3 and the filter cartridge 1 is replaced in grooves 30 and the filtering process continues.

It should also be appreciated that the present structure provides that the frame is internally of and slidable with respect to, the envelope. There is no permanent attachment between the frame and the filter envelope. As a result, no portion of the envelope is wasted because of requirements for the envelope attachment to the frame. This allows the envelope to be filled with more material.

Preferably, the separators 9 are thin so that they don't impede the flow of water through the filter envelope. They also, preferably, extend laterally forward and behind the frame surface to adequately space apart the walls of the filter envelope.

What is claimed is:

1. A water filter article, comprising:
   a) a first porous filter wall having a first density configured to mechanically filter liquid flowing into the filter article; and
   b) a second porous filter wall spaced apart from the first porous filter wall, the second porous filter wall having a second density configured to mechanically filter liquid flowing out of the filter article;
   c) wherein the first density of the first porous filter wall is less than the second density of the second porous filter wall.

2. A filter article according to claim 1, wherein first and second filter walls are comprised of a water permeable filter membrane material.

3. A filter article according to claim 2, wherein the filter membrane material is selected from the group consisting of nonwoven fabric material, polymeric foam material and mixtures thereof.

4. A filter article according to claim 3, wherein the filter wall comprises a nonwoven fabric material.

5. A filter article according to claim 4, wherein the nonwoven fabric has a fabric weight per unit length ranging from about 2 to about 15 oz per linear yard.

6. A filter article according to claim 5, wherein the nonwoven fabric material of the first filter wall comprises a blend of fiber deniers ranging from about 4 to about 20 denier.

7. A filter article according to claim 5, wherein the nonwoven fabric material of the second filter wall comprises a blend of fiber deniers ranging from about 1 to about 8 denier.

8. A filter article according to claim 3, wherein the filter wall comprises a polymeric foam material.

9. A filter article according to claim 8 wherein the polymeric foam materials of the first filter wall has a density of from about 10 to about 25 ppi.

10. A filter article according to claim 8 wherein the polymeric foam material of the second filter wall has a density of from about 20 to about 45 ppi.

11. A filter article according to claim 1, wherein the first and second spaced apart porous filter walls define an interior volume.

12. A filter article according to claim 11, wherein the interior volume is sized and configured for receipt of a frame.

13. A water filter article, comprising:
   a) a first porous filter wall for filtering liquid flowing into the filter article;
   b) a second porous filter wall for filtering liquid flowing out of the filter article; and
   c) a frame positioned between the first and second porous filter walls for providing structure to the filter;
      wherein the density or surface area of the first porous filter wall is less than the density or surface area of the second porous filter wall.

14. A water filter article according to claim 13, wherein the frame is configured to provide bacterial growth for biological filtration.

15. An aquarium water filter article, comprising:
   a) a first porous filter wall for filtering liquid flowing into the filter article;
   b) a second porous filter wall for filtering liquid flowing out of the filter article; and
   c) a frame positioned between the first and second porous filter walls for providing structure to the aquarium filter;
      wherein the density or surface area of the first porous filter wall is less than the density or surface area of the second porous filter wall.

16. A water filter for filtering water in an aquarium, the water filter comprising:
   a) a mechanical filtration element including a replaceable filter article, the replaceable filter article having:
      i) a first porous filter wall having a first density; and
      ii) a second porous filter wall spaced apart from the first porous filter wall, the second porous filter wall having a second greater density;
   b) a biological filtration element including a frame, the frame being positioned between the first porous filter wall and the second porous filter wall of the replaceable filter article.

17. A method of filtering aquarium water, the method comprising:
   a) providing a filter article configured to mechanically filter water, the filter article including:
      i) a first porous filter wall having a first density; and
      ii) a second porous filter wall spaced apart from the first porous filter wall, the second porous filter wall having a second greater density;
   b) filtering aquarium water through the filter article; and
   c) replacing the filter article when the first and second porous filter walls become clogged with retained particles.

18. A method according to claim 17, further including the step of positioning a frame within an interior region of the filter article, the interior being defined by the first and second porous filter walls.

19. A method according to claim 18, wherein the step of positioning the frame includes positioning a frame having a surface area configured to provide biological filtration of the aquarium water.

20. A method according to claim 19, wherein the step of replacing the filter article further includes removing the frame from the interior region of the filter article and placing the frame into a new replacement filter article.

21. A method according to claim 17, wherein the step of filtering aquarium water through the filter article includes circulating water within an interior volume defined by the first and second porous filter walls.

* * * * *